United States Patent [19]

Kern

[11] 4,444,047

[45] Apr. 24, 1984

[54] APPARATUS FOR DETERMINING THE FUEL CONSUMPTION OF INJECTION INTERNAL COMBUSTION ENGINES

[75] Inventor: Eckhard Kern, Hofheim, Fed. Rep. of Germany

[73] Assignee: VDO Adolf Schindling A.G., Fed. Rep. of Germany

[21] Appl. No.: 399,125

[22] Filed: Jul. 16, 1982

Related U.S. Application Data

[63] Continuation-in-part of Ser. No. 1,601,861, Jun. 19, 1980, abandoned.

[30] Foreign Application Priority Data

Jun. 29, 1979 [DE] Fed. Rep. of Germany ....... 2926268

[51] Int. Cl.³ .................... G01L 3/26; G01M 15/00
[52] U.S. Cl. ................................. 73/114; 364/442
[58] Field of Search .................. 73/113, 114; 364/442

[56] References Cited

U.S. PATENT DOCUMENTS 2,276,717 3/1942 Codebecq ........................... 73/113
4,157,031 6/1979 Fiala .................................. 73/113
4,278,059 7/1981 Collonia ........................... 123/399

*Primary Examiner*—Donald O. Woodiel
*Attorney, Agent, or Firm*—Eric P. Schellin

[57] ABSTRACT

Apparatus for determination of the instantaneous fuel consumption of fuel injected engines, for indicating the fuel consumption, or for controlling the power of such engines. It includes means for providing electrical signals indicative of the revolutions of the engine per unit time, the distance traveled and a non-linear means which produces electrical signals based on characteristics dependent on the position of the accelerator pedal or throttle control lever, to obtain an output signal indicative of the fuel consumption, to operate an indicator or to control the power of the engine.

8 Claims, 3 Drawing Figures

APPARATUS FOR DETERMINING THE FUEL CONSUMPTION OF INJECTION INTERNAL COMBUSTION ENGINES

This is a continuation-in-part of application Ser. No. 160,861, filed June 19, 1980, now abandoned.

BACKGROUND OF THE INVENTION

1. Field of the Invention

The invention relates to an apparatus for determining the fuel consumption prevailing at each instant of operation of an internal combustion engine of a motor vehicle. More particularly, the invention relates to such apparatus which comprises a device which supplies an electrical signal indicative of the instantaneous rate of fuel use of the engine, and further comprises devices which supply data on the number of revolutions of the engine and the distance covered, and an indicator stage to which the signals are fed and which determines and indicates the fuel consumption with reference to a distance unit.

2. Prior Art

As is known, in a diesel injection pump there is an internal metering element which moves so as to balance or mediate between the call for a certain level of injection of fuel, received from a movable control rod connected to an external accelerator pedal or throttle lever, and the call for a different level of fuel injection determined by the engine speed. For example, when a diesel engine automobile is descending a steep grade, the internal metering element will deliver less fuel to the engine, for the same setting of the accelerator pedal, than when the automobile is running steadily on the level.

The internal metering element of the injection pump of diesel engines is suited as a mechanical control unit whose motion can supply an electrical signal indicative of fuel conveyed per cycle of the engine. Therefore, it is already known to connect a remote position indicator to the internal metering element, as disclosed in German laid-open patent application DE-OS No. 24 40 398, in order to employ the data thereof for fuel consumption measurement. This, however, is not possible without substantial expense, since the internal metering element is positioned inside the injection pump, and the access to it is therefore very difficult. Upon opening up or modification of the injection pump, damage must be expected which results in a deterioration of its efficiency. Besides, it is difficult to find a transmitter insensitive to shock and temperature which can be located in the engine chamber and which can tolerate the environment prevailing therein and remain accurately adjusted even after long service.

SUMMARY OF THE INVENTION

An object of the invention is, therefore, to furnish data on fuel consumption, dependent on the number of revolutions of an internal combusting engine, with apparatus which is durable, simple, and reliable.

This object is achieved in the apparatus of the invention, as an advance over the prior art, by the provision of a sensor which supplies data on the position of the accelerator pedal, and by the provision of an electric circuit, which is responsive to data from said sensor and is also responsive to the prevailing number of revolutions of the engine, to produce an output electric signal which can be utilized, instead of the signal obtained from the internal metering element of the prior art, as disclosed in the above mentioned German laid-open patent application DE-OS No. 24 40 398. Since the circuit required for this need not be arranged in the engine chamber, it can be advantageously produced with simple, less stressed structural elements in an economical manner.

Particularly, the invention comprises a segmented electric function generator made of few structural parts, which for distinguishable sections of the characteristics has different signal generators, and in which the signal generators are differential amplifiers, operating over different individual voltage ranges.

The segments of the characteristics are produced by a fixed bias supply which is divided by a multiple tap voltage divider circuit to which the differential amplifiers are connected in parallel, so that each successive differential amplifier has a different fixed voltage applied to one of its inputs.

BRIEF DESCRIPTION OF THE DRAWINGS

Further advantages of the invention are explained in greater detail with the aid of the embodiment diagrammatically shown in the drawings, and a diagram for the shape of the characteristics of the injection pump, wherein.

DETAILED DESCRIPTION OF THE PREFERRED EMBODIMENTS

Figure 1:
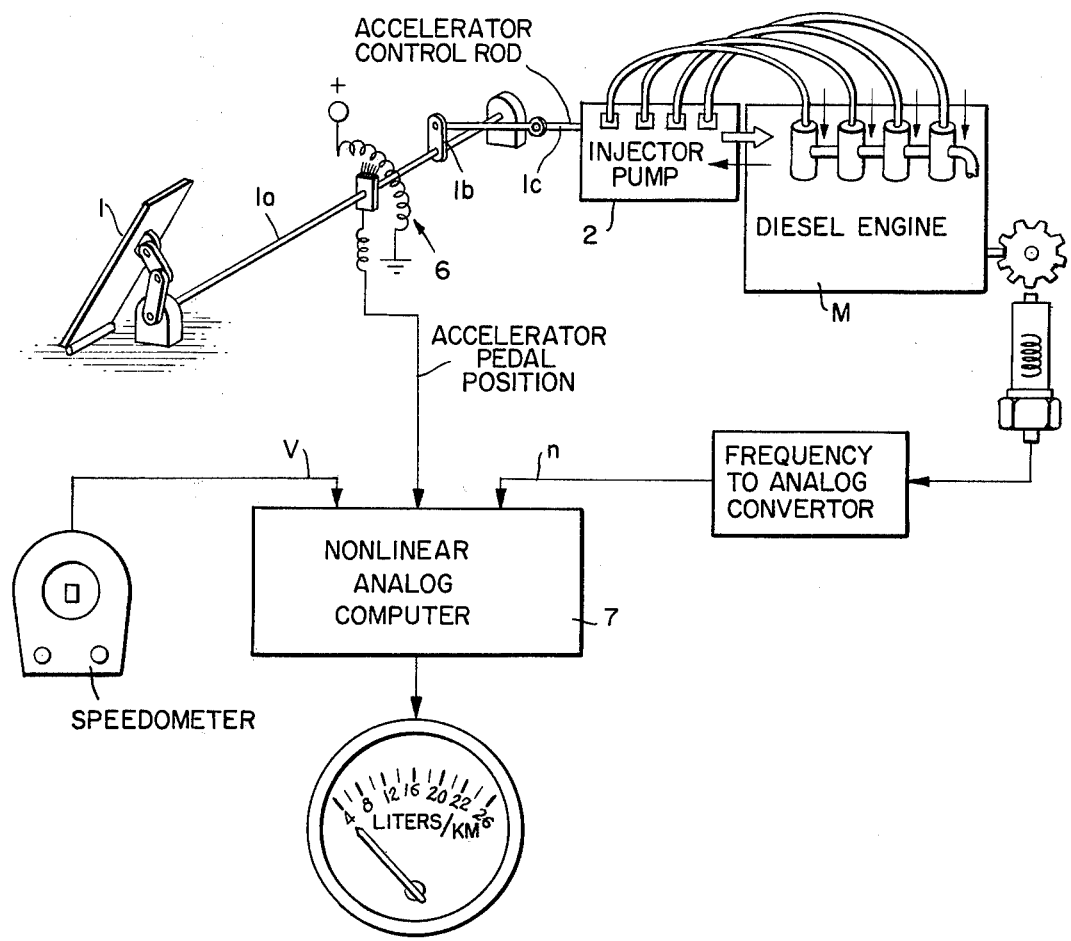
FIG. 1 is a block diagram of the apparatus of the invention.

In the block diagram of FIG. 1, the accelerator pedal 1 acts via rod 1a, lever 1b and accelerator control rod 1c on the injection pump 2 of the engine M, in order to control fuel, depending on the speed of rotation of the engine. The injector pump 2 is directly mounted on and driven by engine M, as indicated by the left-going simple arrow of the drawing, and as much fuel is injected into the engine, in the direction of the right-going hollow arrow, as is appropriate for the setting of rod 1c. As is known, a regulation of equilibrium between fuel delivery and desired traveling speed is necessary, so that fuel injectors inject an amount of fuel which depends upon both accelerator pedal position and engine speed.

From DE-OS No. 24 40 398 it is now known to derive a signal based on the deflection of the internal metering element. This signal may be combined with a speed signal (V) and a number-of-revolutions per unit time signal (n) with which a specific position of the accelerator pedal 1 is associated, and can be converted into data on the fuel consumption prevailing at the instant concerned. The speed signal (V) and the number-of-revolutions per unit time are directly proportional to each other in any one of the several transmission gear ratios, but the constant of proportionality changes with the gear in use.

The invention is based on the signal appearing on the potentiometer 6, without alteration of the interior of the injection pump 2, which signal is fed to the electric circuit 7, in which a signal is generated that corresponds to the characteristic of the injection pump-engine fuel consumption. The invention may be based on the fact that especially injection pumps must for other reasons be manufactured and function so precisely that the injection characteristic does not change essentially during the life of an engine. With the same reliability with which injection pumps and engines operate, it is therefore possible to furnish an indication concerning the fuel consumption prevailing at an instant concerned and to indicate it in volume per distance or time, by means of a circuit which supplies signals corresponding to the consumption characteristics.

Figure 2:
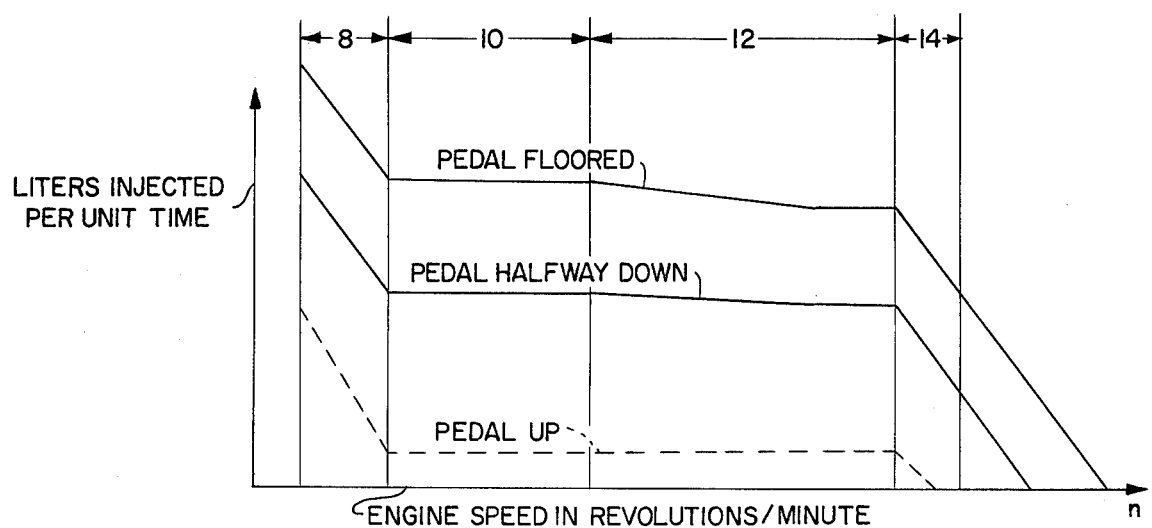
FIG. 2 is a diagram of the quantity of fuel injection characteristics, showing the rate of consumption of an injection pump of a Diesel engine.

FIG. 2 is a diagram of the regulating characteristics of an injector pump. A characteristic corresponds to the motion of the internal metering element of an injection pump, which depends both on the position of the accelerator pedal 1 and the speed of the engine. In FIG. 2 there are shown three plots of fuel consumed (as liters per unit time on the vertical axis) against engine speed (as revolutions per minute on the horizontal axis). Each of the three plots are labeled and respectively represent the condition when the accelerator pedal is all the way down or "floored", when it is halfway down, and when it is all the way up.

It will be noted that each of the three graphs of FIG. 2 is segmented. Over the range 8, where the engine speed is low, as when starting or running at too-low engine speeds, the fuel consumption rises rapidly with decrease of speed, regardless of accelerator pedal setting. Over the range 14, where the engine speed is too high, fuel consumption decreases rapidly with increase of speed, since the self-governing action of the injection pump attempts to limit speed. Over the lower speed normal running range 10 and the higher speed normal running range 12, the fuel consumption is approximately constant, with a slight decrease at higher speeds for the fully depressed pedal, as shown by the upper one of the three graphs.

Figure 3:
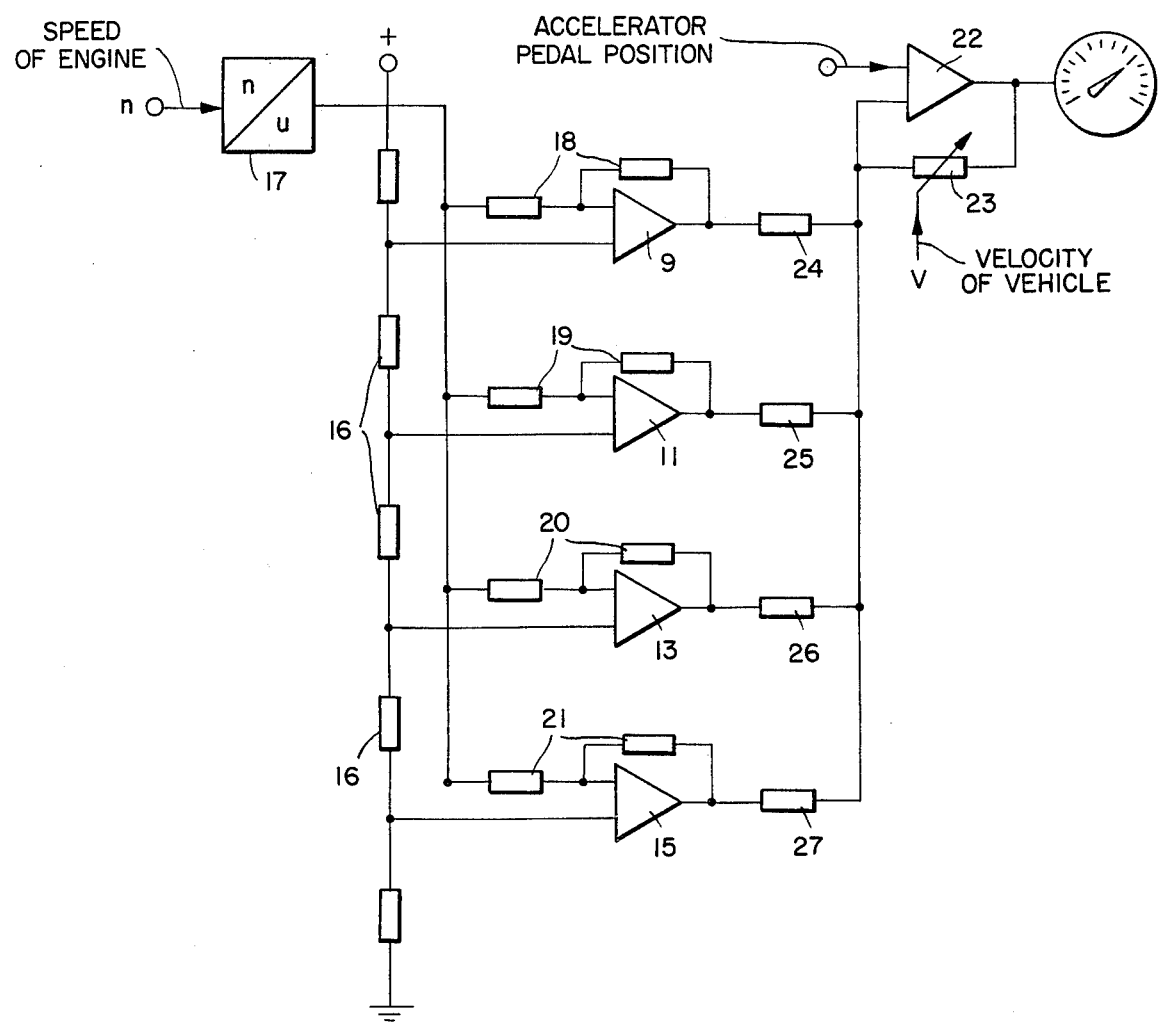
FIG. 3 is a circuit for producing electric signals which correspond to and accurately mimic the said characteristics of the injection pump and Diesel engine.

The characteristic exhibited by the graphs of FIG. 2 is mimicked by means of the electric circuit 7 of FIG. 1, shown in specific detail in FIG. 3.

A separate amplifier is, as shown in FIG. 3, associated with each regulating region of the characteristic plots of FIG. 2. In detail, amplifier 9 is associated with the starting region 8, amplifier 11 with the traveling area of lower numbers of revolutions 10, amplifier 13 with the high speed compensation region 12, and the amplifier 15 with the top speed region of final regulation 14. Amplifiers 9 to 15 are connected in parallel to a voltage divider circuit 16 whose biasing resistors associate corresponding effective regions of the characteristics with the respective amplifiers. Sum-and-difference amplifiers 9 to 15 are supplied in parallel by signals of a converter 17 which produces a voltage signal corresponding to the number of revolutions per unit time of the engine.

In the circuit of FIG. 3, the degree of amplification for each engine speed is matched to the slope of the associated characteristic region of amplifiers 9, 11, 13 and 15 and is adjustable by means of gain control resistors 18, 19, 20 and 21. The output signals supplied by the amplifiers are conveyed to a common amplifier 22 whose gain control resistor 23 is adjustable in a manner dependent on the speed of the vehicle and furnishes the desired indication signal on the consumption of fuel in liters per km to an indicator instrument.

The operation of the circuit of FIG. 3 is simple. The amplifiers 9, 11, 13 and 15, taken together, act as a non-linear amplifier to produce the segmented characteristic seen three times in FIG. 2. These amplifiers successively saturate or bottom so that the output of only one of the four amplifiers varies at a time. When the limit of output of any one amplifier is reached, the next amplifier becomes effective to produce a changing output for application to amplifier 22. The output from the amplifiers 9, 11, 13 and 15 is summed through resistors 24, 25, 26 and 27 and applied to one of the inputs of amplifier 22. To the other input of amplifier 22 is applied the output from potentiometer 6, indicative of pedal position. Thus, amplifier 22 displaces the characteristic of the graph of FIG. 2 upwardly or downwardly by adding or subtracting the accelerator pedal movement signal. The negative feedback resistor 23 is varied in accordance with the vehicle speed so that the amplifier 22 acts as a multiplier, changing the quantity of fuel consumed per unit time into quantity of fuel consumed per distance traveled.

Characteristics of the kind described above can of course also be manufactured with other electric devices for other more or less expensively machines, depending on precision requirements, and can be used for the indication of fuel consumption.

According to a further concept of the invention, the apparatus of the invention can also be employed for regulating the engine power of the motor vehicle for the purpose of a particularly low fuel consumption, namely, due to the fact that a control unit affecting the fuel consumption receives the output signal at least of the electric circuit. According to an advantageous embodiment, the control unit consists in a control unit that regulates the fuel consumption for each cylinder, i.e., a control unit which reduces or interrupts the fuel supply to one or several cylinders of the engine.

What is claimed is:

1. Apparatus for determining the fuel consumption prevailing at each instant of operation of an internal combustion engine of a motor vehicle wherein the engine is supplied by a fuel pump whose output is regulated by the number of revolutions of the engine, comprising:
    first means for supplying a data signal based on the number of revolutions of the engine;
    second means for supplying a signal based on the position of an accelerator pedal of the engine;
    third means for supplying a signal based on the speed of the vehicle; and
    an electric circuit capable of generating a family of fuel consumption versus engine number of revolution characteristic outputs and to which all of the above means may be simultaneously connected to generate an output signal corresponding to the instantaneous fuel consumption of the internal combustion engine.

2. Apparatus as in claim 1, wherein:
    the electric circuit for different characteristic outputs has different signal generators.

3. Apparatus as in claim 2, wherein:
    the signal generators are amplifiers operating at different reference voltage levels.

4. Apparatus as in claim 3, wherein:
    the sections of the characteristic outputs are produced by a multitap voltage divider circuit to which the amplifiers are connected in parallel, each to an individual voltage tap.

5. Apparatus as in claim 1, wherein:
    a visual indicator is connected to said output signal.

6. Apparatus for determining the instantaneous fuel consumption per unit of distance traveled of an injection engine vehicle, in which the amount of fuel injected per injection cycle depends upon both the speed of the engine and the degree of actuation of the accelerator pedal or throttle lever, comprising:
- a nonlinear electric circuit for supplying an output signal which is a bivariate function of two input signals;
- said output signal varying to mimic the varying fuel consumption of a fuel injection engine as a bivariate function of the engine speed and the accelerator pedal or throttle position;
- means for feeding to said nonlinear circuit a first signal which is a measure of the speed of the engine;
- means for feeding to said nonlinear circuit a second signal which is a measure of the accelerator pedal or throttle lever position;

whereby the output signal from said nonlinear circuit is a measure of the fuel consumption of said injection engine per unit time;
- means for sensing the velocity of said vehicle and for dividing said output signal by the said velocity to develope a further signal which is a measure of the instantaneous fuel consumption in terms of quantity of fuel per unit of distance traveled.

7. The subject matter of claim 6, in which said further signal is fed to an indicator to thereby visually display the instantaneous fuel consumption.

8. The subject matter of claim 6, in which said further signal is used to control the operation of said injection engine.

* * * * *